(12) United States Patent
Kim et al.

(10) Patent No.: US 11,367,863 B2
(45) Date of Patent: Jun. 21, 2022

(54) POROUS SILICON ANODE FOR RECHARGEABLE METAL HALIDE BATTERY

(71) Applicant: International Business Machines Corporation, Armonk, NY (US)

(72) Inventors: Jangwoo Kim, San Jose, CA (US); Young-Hye Na, San Jose, CA (US); Robert David Allen, San Jose, CA (US); Joel P. de Souza, Putnam Valley, NY (US); John Collins, Tarrytown, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/685,105

(22) Filed: Nov. 15, 2019

(65) Prior Publication Data
US 2021/0151743 A1    May 20, 2021

(51) Int. Cl.
| | | |
|---|---|---|
| *H01M 4/134* | (2010.01) | |
| *H01M 4/60* | (2006.01) | |
| *H01M 4/1395* | (2010.01) | |
| *H01M 10/0525* | (2010.01) | |
| *H01M 4/02* | (2006.01) | |

(52) U.S. Cl.
CPC ......... *H01M 4/134* (2013.01); *H01M 4/1395* (2013.01); *H01M 4/604* (2013.01); *H01M 10/0525* (2013.01); *H01M 2004/027* (2013.01); *H01M 2004/028* (2013.01); *H01M 2300/0028* (2013.01)

(58) Field of Classification Search
CPC ........... H01M 4/0492; H01M 10/0525; H01M 4/604; H01M 10/052; H01M 2004/021; Y02E 60/10
See application file for complete search history.

(56) References Cited

U.S. PATENT DOCUMENTS

| | | | |
|---|---|---|---|
| 4,037,025 A | 7/1977 | Dey et al. | |
| 4,246,327 A | 1/1981 | Skarstad et al. | |
| 7,402,829 B2 | 7/2008 | Green | |
| 7,883,554 B2 | 2/2011 | Cho et al. | |

(Continued)

FOREIGN PATENT DOCUMENTS

| | | |
|---|---|---|
| CN | 106711415 B | 5/2019 |

OTHER PUBLICATIONS

Ge et al., Porous Doped Silicon Nanowires for Lithium Ion Battery Anode with Long Cycle Life, Nano Letters 12:2318-2323 (2012).

(Continued)

*Primary Examiner* — Cynthia H Kelly
*Assistant Examiner* — Monique M Wills
(74) *Attorney, Agent, or Firm* — Karen Canaan; CanaanLaw, P.C.

(57) ABSTRACT

A battery includes a cathode with a metal halide and an electrically conductive material, wherein the metal halide acts as an active cathode material; a porous silicon anode with a surface having pores with a depth of about 0.5 microns to about 500 microns, and a metal on the surface and in at least some of the pores thereof; and an electrolyte contacting the anode and the cathode, wherein the electrolyte includes a nitrile moiety.

25 Claims, 8 Drawing Sheets

(56) References Cited

U.S. PATENT DOCUMENTS

| | | | |
|---|---|---|---|
| 9,893,383 B2 | 2/2018 | Raub et al. | |
| 2009/0186267 A1 | 7/2009 | Tiegs | |
| 2011/0111294 A1 | 5/2011 | Lopez et al. | |
| 2012/0231326 A1 | 9/2012 | Biswal et al. | |
| 2013/0252101 A1 | 9/2013 | Zhou et al. | |
| 2016/0104882 A1 | 4/2016 | Yushin et al. | |
| 2017/0098823 A1* | 4/2017 | Yushin | H01M 4/628 |
| 2018/0331356 A1* | 11/2018 | Feaver | H01M 4/366 |
| 2019/0109317 A1 | 4/2019 | Zhou et al. | |
| 2019/0221887 A1* | 7/2019 | Kim | H01M 10/0569 |

OTHER PUBLICATIONS

Kim et al., Three-Dimensional Porous Silicon Particles for Use in High-Performance Lithium Secondary Batteries, Angew. Chem. Int. Ed. 47:10151-10154 (2008).

Yang et al., Accommodating lithium into 3D current collectors with a submicron skeleton towards long-life lithium metal anodes, Nature Communications, pp. 1-9 (6:8058; DOI: 10.1038/ncomms9058; www.nature.com/naturecommunications) (2015).

Zhou et al., Hierarchical micro/nano porous silicon Li-ion battery anodes, Chem. Commun. 48:5079-5081 (2012).

International Search Report and Written Opinion for counterpart PCT Application No. PCT/IB2020/095002 dated Jan. 27, 2021.

\* cited by examiner

POROUS SILICON ANODE FOR RECHARGEABLE METAL HALIDE BATTERY

BACKGROUND

Common rechargeable batteries run via electrochemical intercalation/de-intercalation behavior of acting ions, or via a conversion reaction of active electrode/electrolyte materials. In one example, a lithium-ion battery can utilize an intercalated lithium compound as an electrode material. A liquid electrolyte carries positively charged lithium ions from the anode to the cathode, and vice versa. During discharge, the movement of the lithium ions creates free electrons in the anode, which creates a charge at a positive current collector connected to the cathode, simultaneously generating an electrical current through an external circuit. During charging, the opposite process occurs, where an electrical current flows from the positive current collector through a device being powered (cell phone, computer, etc.) to a negative current collector connected to the anode. While the battery is discharging and providing an electric current, the anode releases lithium ions to the cathode, generating a flow of electrons from one side to the other. When the battery is being charged, lithium ions are released by the cathode and received by the anode.

Potentially hazardous liquid electrolytes, as well as the relatively low energy density and high cost of cathode materials, can limit the potential applications for rechargeable batteries such as, for example, lithium-ion batteries. As an alternative to the intercalated lithium anodes, lithium metal has a high energy storage capacity and has been utilized as a primary battery anode material. However, in some cases lithium metal anodes can form dendrites, which can cause short circuits during battery operation. In addition, when exposed to ambient conditions during use of the battery device, lithium metal and/or liquid electrolyte components can under some conditions be flammable. It has also proven difficult to find reasonably inexpensive cathode materials that can accommodate the large amount of lithium ions and electrons extracted from a lithium metal anode.

Silicon anodes do not produce dendrites during battery operation, and can provide high energy density. However, the volume of silicon changes significantly during lithiation and delithiation as battery charging and discharging cycles proceed, which can lead to particle pulverization and cause formation of an unstable solid-electrolyte interphase (SEI) layer on the electrode. The SEI layer can cause the loss of electrical contact at the electrode surface, which can result in capacity fading and limited battery cycle life. In addition, in some cases silicon electrode materials may not be compatible with common electrolyte materials.

SUMMARY

In general, the present disclosure is directed to a rechargeable metal halide battery including a porous silicon anode and a metal halide cathode. The metal halide battery has high energy density and excellent cycling behavior. Silicon has a higher theoretical gravimetric capacity compared with lithium metal as an anode, with improved safety, as silicon anodes enable high potential for the control of lithium metal in energy storage devices. In one example embodiment, to make the porous silicon anode, a crystalline silicon substrate is anodized to provide a porous surface region, which increases the specific surface area and improves the surface reactivity of the substrate material. The porous surface provides a silicon anode with sustainably reversible charge hosting and delivery, and enhanced longevity when subjected to repeated charging and discharging cycles. In some embodiments, the porous silicon anode may optionally be plated or alloyed with other metals such as, for example, lithium, to further enhance performance.

In one aspect, the present disclosure is directed to a battery that includes a cathode with a metal halide and an electrically conductive material, wherein the metal halide acts as an active cathode material; a porous silicon anode with a surface having pores with a depth of about 0.5 microns to about 500 microns, and a metal on the surface and in at least some of the pores thereof; and an electrolyte contacting the anode and the cathode, wherein the electrolyte includes a nitrile moiety.

In another aspect, the present disclosure is directed to a battery, including: (a) an anode that takes up metal ions from an electrolyte during charging, and releases the ions to the electrolyte during discharging, the anode including a porous silicon with pores having a depth of at least 0.5 microns; (b) a cathode including a metal halide that functions as an active material for the battery and an electrically conductive material, wherein the metal is selected from the group of Li, Na, Mg and mixtures and combinations thereof, and the halide is selected from the group consisting of I—, Br—, Cl—, F—, and mixtures and combinations thereof; and (c) an electrolyte, wherein the electrolyte has a solvent including a nitrile compound.

In another aspect, the present disclosure is directed to a method of forming a battery. The method includes anodizing a crystalline Si substrate to form a porous Si anode with pores having a depth of at least 500 nm; metalizing the porous Si anode with a metal selected from the group consisting of Li, Na, Mg, Zn, Al, and mixtures and combinations thereof; soaking a separator with an electrolyte solution including an active cathode material including a metal halide and a non-aqueous solvent comprising a nitrile compound; placing the separator soaked with the electrolyte solution between the anode and a current collector; and introducing an oxidizing gas to the stacked anode, the separator soaked with the solution, and the current collector to form the battery.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

Figure 1:
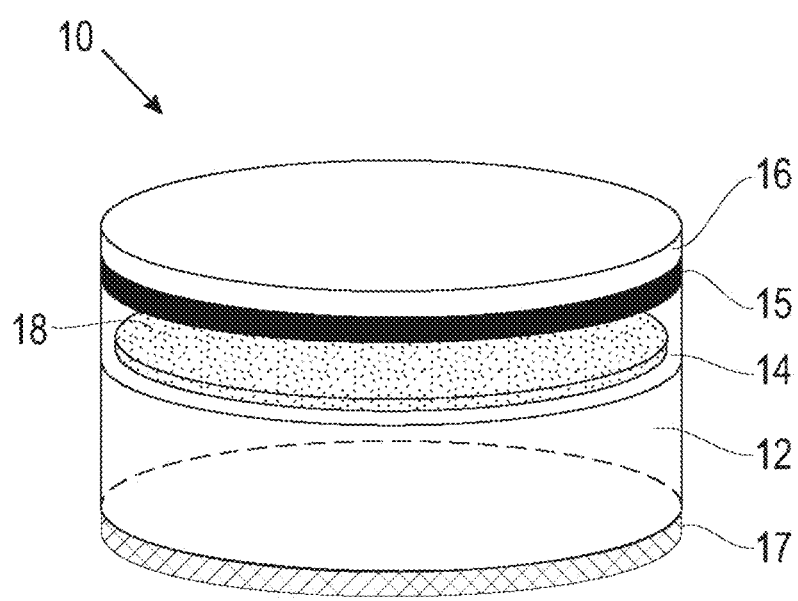
FIG. 1 is a conceptual diagram illustrating an example battery including an anode, an electrolyte, a current collector, and an optional separator.

FIG. 1 is a conceptual diagram illustrating an embodiment of a battery 10 including an anode 12, an electrolyte 14, a cathode current collector 16, an optional separator 18, and an optional anode current collector 17. The battery 10 operates via reduction-oxidation (redox) reactions, and utilizes different oxidation states and redox reactions of one or more components or elements for charge and discharge. The structure shown in FIG. 1 is an example embodiment, and can be altered to include various shapes, sizes, scales, and the like. For example, the battery 10 can be in the form of a pouch cell, a three-dimensional (3D) batteries, and the like.

The anode 12 includes a porous silicon substrate, which in some embodiments may include or consist of crystalline Si. In various embodiments, the Si substrate can be single crystalline Si, multi-crystalline Si, poly crystalline Si, or mixtures and combinations thereof.

In some embodiments, the Si substrate may optionally be doped with impurities to modify the conductivity of the elemental Si. For example, the Si substrate may be p-doped with elements such as boron (B), aluminum (Al), indium (In), gallium (Ga), and mixtures and combinations thereof. The p-dopants are substitutional trivalent impurities in the silicon crystal lattice, thus leaving a hole in the valence band of tetravalent-valence structured silicon atoms. Impurities may be incorporated into the Si substrate by a wide variety of techniques including, but not limited to, ion implantation, epitaxial growth of Si with controlled dopant concentrations, and the like.

Figure 2:
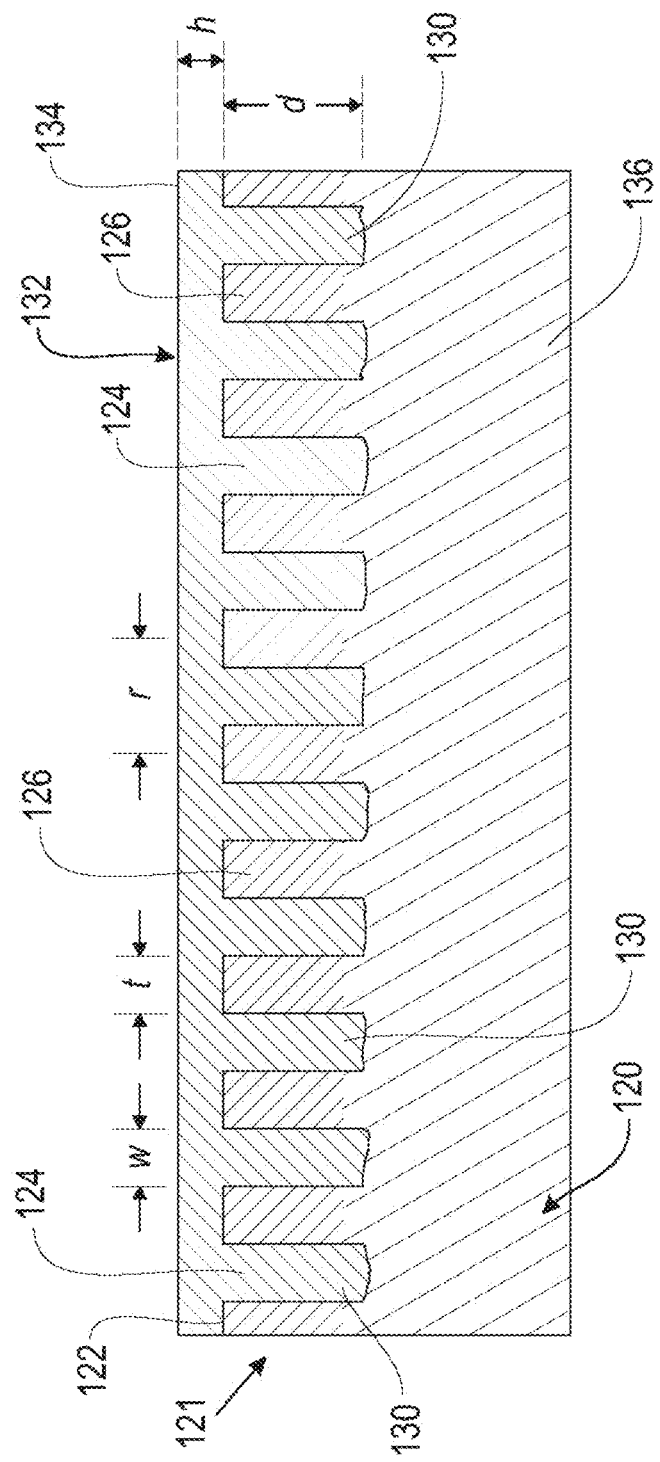
FIG. 2 is a schematic cross-sectional view of a porous silicon substrate.

As shown schematically in FIG. 2, the Si substrate 120 is porous, which in this application means that the substrate 120 includes a porous region 121. Utilizing the above conditions, the porous region 121 includes a plurality of pores 124 extending below an exposed surface 122 of the substrate 120.

The pores 124 have an average pore diameter w of about 3 nm to about 5 nm, an average depth d from the surface 122 to the full thickness of the porous region of the substrate 120 or from the top of the surface 122 to about 5 microns to about 25 microns, or about 7 microns to about 20 microns, or about 7 microns to about 13 microns. The walls 126 between the pores 124 have an average wall thickness t of less than about 2 nm to greater than about 10 nm or about 6 nm to about 10 nm. In some embodiments, the walls 126 have an average center-to-center spacing r of about 5 nm to about 20 nm, or about 10 nm to about 20 nm, or about 12 nm to about 17 nm.

The pores 124 may be formed in the surface 122 of the Si substrate 120 by any suitable technique such as, for example, electrochemical etching, catalytic etching, stain etching, and the like. One particularly useful technique for producing the pores 124 is an electrochemical anodizing process, which is conducted in an electrochemical cell. In one example anodizing process, which is not intended to be limiting, the Si substrate 120 is immersed in a concentrated hydrofluoric acid electrolyte bath in which the Si substrate 120 forms the positive electrode, and the negative electrode is a plate or rod of a material that is chemically inert in the concentrated HF bath such as, for example, carbon, graphite, metals such as Pt, Au and the like. In various example embodiments, which are not intended to be limiting, the anodization process is performed using a constant current source that operates at a current density from 0.05 mA/cm$^2$ to 150 mA/cm$^2$, or from 1 mA/cm$^2$ to 10 mA/cm$^2$.

The anodization process creates a porous region at the surface of the Si substrate having pore characteristics controlled by the anodization time. In one example, which is not intended to be limiting, a surface porous region of having pores 124 with a depth d of about 10 µm is obtained for a 1200 second anodization in an HF electrolytic bath with a current density of 5 mA/cm$^2$. In another embodiment from the working examples below, which is not intended to be limiting, the anodization conditions used to create the porous region 121 are the following: 49% HF solution, anodization current density of 5 mA/cm$^2$, and a p-type Silicon doped substrate (B-doped at approximately $1 \times 10^{19}$/cm$^3$) and anodization time from about 30 seconds to 40 min. For a boron-doped Si substrate having a doping level in the $10^{19}$ per cm$^3$ range, anodized in a concentrated HF bath at nominal room temperature (about 25° C.), the current density of 5 mA/cm$^2$ is applied for about 1 second to about 5 hours, or for about 2000 seconds to about 10000 seconds. In this example anodization process, pores 124 having an average depth d from the surface 122 of about 5-6 microns are formed with 500 seconds anodization time, pores having a depth of about 7-13 microns are formed with 1200 sec anodization time, and pores having a depth of about 20-25 microns are formed with 2400 sec anodization time.

The walls 126 between the pores 124 have an average wall thickness t that also depends on the time and current utilized during the anodization etch process. As a non-limiting example, porous silicon substrates anodized at 5 mA/cm$^2$ for 200 sec have a pore diameter range of about less than about 2 nm to greater than about 6 nm, and a porous silicon substrate anodized at 5 mA/cm$^2$ for 500 sec can have a pore diameter range of less than about 2 nm to greater than about 10 nm.

Following the anodization process, the resulting porous Si structure is optionally rinsed with deionized water and then dried.

Referring again to FIG. 2, in some embodiments the chemical and physical structure of the porous region 121 may optionally be modified by metallizing the porous Si substrate such that a metal resides on the surface 122 and in at least some of the pores 124. The porous substrate 120 may be metallized by any suitable technique. For example, a simple technique such as direct melt-alloying may be used in which the metal is melted and contacted with the porous substrate 120, although any suitable metal deposition procedure may be used such as, for example, atomic layer deposition (ALD), vapor deposition, electrochemical plating, and the like.

Any metal or alloy, combinations of metals, combinations of alloys, or combinations of metals and alloys, may be incorporated into the pores 124. The selected metal, alloy, or combination thereof should be able to move back and forth between the battery anode and cathode in an ionized form through the electrolyte media, and should have a reasonably large potential difference (greater than about 1 V) with the active cathodic material. Suitable examples include, but are not limited to, lithium, sodium, magnesium, zinc, aluminum, and the like. If the metallized substrate is intended for use in a lithium battery, metallization with Li has been found to be particularly useful, and such a Li metallization process is referred to herein as pre-lithiation.

In some embodiments, the metal 130 fills the pores 124 and forms a metal region 132 with a substantially planar metal surface 134. In some embodiments, the metal region has a metal concentration gradient, in which the metal concentration is greatest near the surface 134, and gradually decreases in the pores 124. The porous region 121 of the Si substrate 120, and a crystalline region 136 of the Si substrate immediately below the porous region 121 are electrically, physically and chemically interconnected to form a unitary structure. In some embodiments, the metal surface 132 is very smooth, with a root mean square (RMS) surface roughness of less than about 10 Angstroms (Å), or less than 5 Å, or less than about 3 Å, although a smooth surface is not required for efficient battery operation. In some example embodiments, which are not intended to be limiting, the metal surface 132 has a height h above the surface 122 of about 10 nm to about 100 nm, about 10 nm to about 50 nm, or about 10 nm to about 20 nm.

The anode 12 takes up metal ions from the electrolyte 14 during charging, and releases the metal ions to the electrolyte 14 during discharging. The electrolyte 14, which may be aqueous or non-aqueous, includes a solvent, a metal halide, and an optional oxidizing gas. The solvents in the electrolyte 14 may be selected to further improve the electrochemical performance of battery 10, such as, for example, by enhancing rechargeability, cyclability, electrode structure, or the like. In various embodiments, which are not intended to be limiting, suitable solvents may be chosen from non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dimethoxyethane (DME), and mixtures and combinations thereof. In some embodiments, non-aqueous solvents including nitrile compounds have been found to be particularly useful.

In some embodiments, the electrolyte 14 may include an optional heterocyclic compound, which in this application refers to an aromatic or non-aromatic cyclic compound having as ring members atoms of at least two different elements. A cyclic compound (ring compound) as used in the present application refers to a compound in which one or more series of atoms in the compound is connected to form a ring. In various embodiments, suitable cyclic compounds for the electrolyte 14 include 5-membered rings such as pyrrolidines, oxolanes, thiolanes, pyrroles, furans and thiophenes; 6-membered rings such as piperadines, oxanes, thianes, pyridines, pyrans and thiopyrans; and 7-membered rings such as azepanes, oxepanes, thiepanes, azepines, oxepines, and thiepenes. Examples of suitable heterocyclic compounds include, but are not limited to, tetrahydrofuran, tetrahydropyran, tetrahydrothiophene, oxathiolane, succinimide, oxazolidone, γ-butyrolactone, γ-caprolactone, ε-caprolactone, γ-valerolactone, pyrrolidine, imidazolidine, sulfolane, thiane and mixtures and combinations thereof In some embodiments, suitable heterocyclic compounds include, but are not limited to, cyclic ethers, cyclic esters, and mixtures and combinations thereof.

The electrolyte 14 also includes a metal halide (e.g., MX, where M is a metal element and X is a halogen element), which provides the electrolyte 14 with ionic conductivity. In some examples, the metal halide includes an electrolyte salt that dissociates into a respective halide ion and a respective metal ion. For example, the metal halide may dissolve in the solvent of the electrolyte 14, and dissociate into its respective metal and halide ions. In some examples, which are not intended to be limiting, the halide ion may include an ion of at least one of I, Br, Cl, or F (e.g., X may be I, Br, Cl, or F), and the metal ion may include an ion of at least one of Li, Mg, or Na (e.g., M may be Li, Mg, or Na).

In some embodiments, the electrolyte 14 includes an optional additional salt that dissociates into a respective metal ion and a respective counter anion. In some examples, which are not intended to be limiting, the metal ion includes at least one of Li, Mg, and Na, and the counter anion includes one or more of nitrate ($NO_3^-$), hexafluorophosphate ($PF_6^-$), tetrafluoroborate ($BF_4^-$), bisoxalato borate ($BOB^-$), difluorooxalato borate ($DFOB^-$), trifluoromethanesulfonate ($TF^-$), and trifluorosulfonylimide ($TFSI^-$).

In some embodiments, the metal halide of electrolyte 14 functions as an active cathode material that receives, stores, and releases its metal ions during charging and discharging of battery 10. The battery 10 thus lacks a dedicated cathode material, and relies on the active cathode material of the metal halide of electrolyte 14 and a current collector 16 for ion transport. In turn, the battery 10 may be cheaper to make, more lightweight, have a higher power density, or combinations thereof. In some cases, the high power density of the electrolyte including the metal halide that functions as an active cathode material may enable the battery 10 to be charged significantly faster than some other batteries that do not include the electrolyte described herein. In some examples, an electrolyte lacking the metal halide may have reduced electrochemical performance (e.g., reversibility, rechargeability, and/or cyclability), produce irreversible carbonate byproducts, have reduced power density, or combinations thereof, in comparison to an electrolyte 14 including the metal halide.

In some embodiments, the electrolyte 14 includes or may be in the presence of an optional oxidizing gas, and "includes an oxidizing gas" as utilized herein is intended to include either configuration. In some examples, the oxidizing gas may be dissolved in the solvent of electrolyte 14. In some examples, which are not intended to be limiting, the oxidizing gas includes at least one of oxygen, air, nitric oxide, or nitrogen dioxide. The oxidizing gas helps induce the redox reactions of battery 10 as described above, and helps achieve highly reversible redox reactions, which may contribute to enhanced electrochemical performance of battery 10. The oxidizing gas may help induce such redox reactions, but is not consumed or evolved during use of battery 10 (e.g., the oxidizing gas does not participate in the redox reactions of battery 10). In some examples, an electrolyte including a metal halide and a solvent, but not including an oxidizing gas, may exhibit little or no rechargeability.

The current collectors 16-17 may include any material with suitable electrical conductivity to collect electrons generated by a redox reaction during discharge of battery 10 and provide a conductive path to an external electrical circuit to which battery 10 is connected. Similarly, during recharge of battery 10, the current collectors 16-17 provide an electrical pathway between an external voltage source and the electrolyte 14 to supply voltage for another redox reaction to charge the battery 10. In some examples, the current collectors 16-17 may include electrically conductive powders such as metal and/or carbon powders, woven or non-woven metal fibers, metal foam, woven or non-woven carbon fibers, or the like. In some embodiments, the current collectors 16-17 may include stainless-steel mesh, aluminum (Al) mesh, nickel (Ni) foam, and/or carbon paper. For example, in one embodiment, one or both of the current collectors 16-17 include a stainless-steel mesh with carbon nanoparticles deposited thereon. As yet another example, one or more of the current collectors 16-17 may be a porous material that is electrically conductive.

In other examples, the battery 10 may include an optional dedicated cathode material 15 in addition to the metal halide that functions as the active cathode material. For example, the battery 10 may include a cathode 15 that provides a conductive path to an external electrical circuit to which battery 10 is connected. In some cases, the battery 10 may include a cathode that may be used in a Li-ion battery. For example, the cathode may include at least one of lithium cobalt oxide (LCO, e.g., $LiCoO_2$), nickel cobalt aluminum (NCA, e.g., $LiNi_xCo_yAl_zO_2$, $LiNi_{0.8}Co_{0.15}Al_{0.5}O_2$), lithium ion manganese oxide (LMO, e.g., $LiMn_2O_4$), lithium manganese oxyfluoride (LMOF), lithium nickel manganese cobalt oxide (NMC, e.g., $LiNiMnCoO_2$), nickel cobalt manganese (NCM, e.g., $LiNi_xCo_yMn_zO_2$, $LiNi_{0.33}Co_{0.33}Mn_{0.33}O_2$) or lithium iron phosphate (LFP, e.g., $LiFePO_4$).

In some examples, the battery 10 includes an optional separator 18. The separator 18 prevents physical contact between opposing electrodes and consequentially prevents short circuit of the battery due to prevention of electron transport through the full internal circuit such that the electrons do not travel through battery 10 (e.g., through electrolyte 14 of battery 10), while still enabling the metal ions to flow through battery 10 during charge and discharge. In some examples, the separator 18 may be soaked with electrolyte 14, within electrolyte 14, surrounded by electrolyte 14, or the like. In various embodiments, the separator 18 includes an electrically non-conductive material to prevent movement of electrons through battery 10 such that the electrons move through the external circuit instead. In some non-limiting examples, the separator 18 can be made from glass, non-woven fibers, polymer films, rubber, or the like.

In some examples, the battery 10 is housed in a closed or substantially closed cell or enclosure. In this way, the oxidizing gas of electrolyte 14 remains within the battery 10 such that the battery 10 has a relatively fast charging rate, high energy efficiency, high power density, high reversibility, high cyclability, or combinations thereof, as described herein.

In some embodiments, the battery 10 may be capable of undergoing many charging and discharging cycles (e.g., exhibits good rechargeability), even at relatively high charging densities. In some examples, battery 10 is capable of completing at least 100 cycles of charging and discharging at a current density of greater than or equal to about 1 $mA/cm^2$, about 5 $mA/cm^2$, about 10 $mA/cm^2$, or about 20 $mA/cm^2$. As one example, battery 10 may be capable of completing at least 1000 cycles of charging and discharging at a current density of greater than or equal to about 1 $mA/cm^2$, about 5 $mA/cm^2$, about 10 $mA/cm^2$, or about 20 $mA/cm^2$.

In embodiments in which the anode is a crystalline Si substrate metallized by an anodization process, in some examples, which are not intended to be limiting, a ratio of an average cycle life of the battery 10, in number of charge/discharge cycles to anodizing time, is greater than or equal to about 2, or greater than or equal to about 6, or greater than or equal to about 12.

In some embodiments, the battery 10 exhibits a relatively high energy efficiency. For example, battery 10 may exhibit an energy efficiency of greater than or equal to 90% at a current density of greater than or equal to about 1 $mA/cm^2$, about 5 $mA/cm^2$, about 10 $mA/cm^2$, or about 20 $mA/cm^2$. In some examples, battery 10 may exhibit an energy efficiency of greater than or equal to 99% at a current density of greater than or equal to about 1 $mA/cm^2$, about 5 $mA/cm^2$, about 10 $mA/cm^2$, or about 20 $mA/cm^2$.

Figure 3:
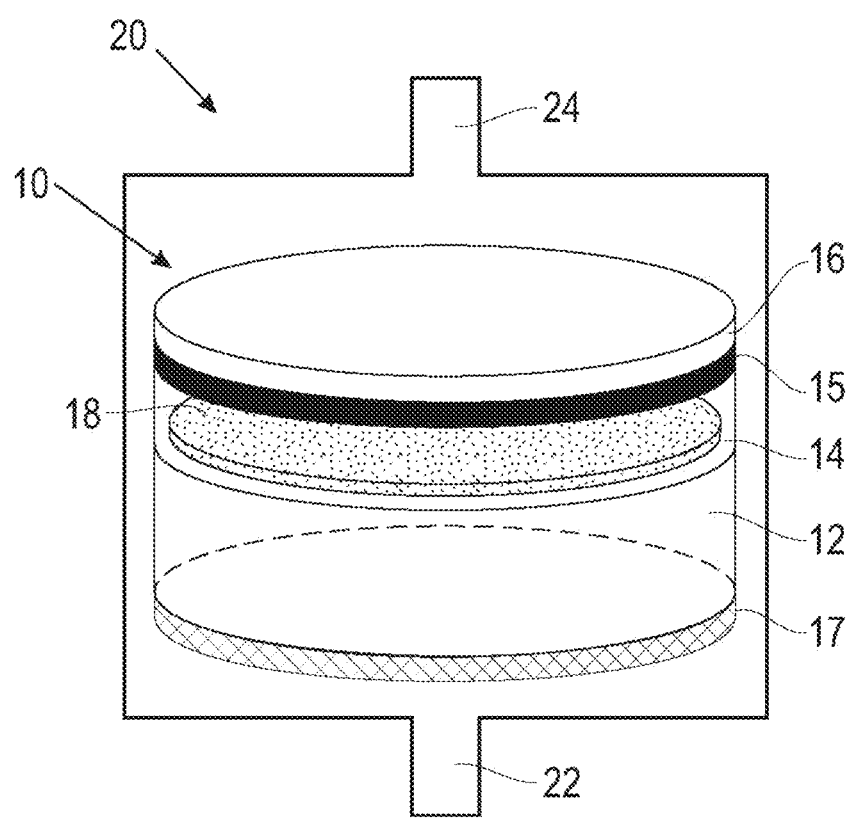
FIG. 3 is a conceptual diagram illustrating the example battery of FIG. 1 within an enclosed cell.

FIG. 3 is a conceptual diagram illustrating the example battery 10 of FIG. 1 within an enclosed cell system 20. The enclosed cell system 20 may include a cell that houses battery 10 during operation, a cell used to fabricate battery 10, or both. For example, the enclosed cell system 20 may include a cell available from Swagelok of Solon, OH, under the trade designation SWAGELOK, and may be used to fabricate battery 10. In some examples, enclosed cell system 20 may include an inlet tube 22 and/or an outlet tube 24. Inlet tube 22 and outlet tube 24 may be used to introduce and remove air or other gases, such as the oxidizing gas of electrolyte 14, into and out of the enclosed cell.

In one example, to fabricate the enclosed cell system 20 of FIG. 2, a metal halide is dissolved in a solvent to form a solution. To dissolve the metal halide in the solvent, the metal halide may be added to the solvent and lightly stirred, such as lightly stirred overnight. In some examples, the solution of the metal halide dissolved in the solvent has a concentration of between about 0.1 M and about 20 M, about 0.5 M and about 10 M, or about 1 M and about 5 M.

In some examples, the metal halide may be dried prior to being dissolved in the solvent. The drying temperature and/or drying time may be chosen based on the metal halide to be used in electrolyte 14, and in some non-limiting examples the metal halide may be dried on a hotplate in an argon filled glovebox at about 120° C. for greater than 12 hours.

The optional separator 18 is then soaked with the electrolyte solution by, for example, dipping. In some examples, soaking separator 18 with the solution may include soaking separator 18 with a solution of about 1 $\mu L/cm^2$ to about 500 $\mu L/cm^2$, about 10 $\mu L/cm^2$ to about 250 $\mu L/cm^2$, or about 50 $\mu L/cm^2$ to about 100 $\mu L/cm^2$.

The anode 12, the optional separator 18 soaked with the solution, and current collector 16 can then be stacked together within the enclosed cell system 20. In some examples, the stacking step may include placing separator 18 between anode 12 and current collector 16. In some examples, one or more of anode 12, separator 18 soaked with the solution, or current collector 16 may be stacked prior to soaking separator 18 with the solution. For example, the separator 18 may be stacked on anode 12 and then soaked with the solution. In some cases, the enclosed cell system 20 may be at least partially open during the stacking procedure, and after anode 12, separator 18 soaked with the solution, and current collector 16 have been stacked, the enclosed cell system 20 may be closed or substantially closed to form a closed or substantially closed volume around anode 12, separator 18 soaked with the solution, and current collector 16.

An oxidizing gas may optionally be introduced into the enclosed cell system 20. In some examples, the oxidizing gas may be introduced into enclosed cell system 20 via inlet tube 24. In some examples, enclosed cell system 20 may include or be in the presence of an inert gas, such as argon, prior to introducing the oxidizing gas to enclosed cell system 20. In some such examples, introduction of the oxidizing gas may purge and completely replace the inert gas within enclosed cell system 20 with the oxidizing gas. For example, the oxidizing gas may be introduced to the enclosed cell 20 via inlet tube 24, and the inert gas may be purged through outlet tube 26. In some examples, the concentration of the oxidizing gas in enclosed cell system 20 may be between about 5 weight (wt) % and about 100 wt %, about 50 wt % and about 100 wt %, or about 80 wt % and about 100 wt % of the total amount of gases within enclosed cell system 20, such as of the total amount of the oxidizing gas and the inert gas within enclosed cell system 20.

The present disclosure will now be described with respect to the following non-limiting examples.

EXAMPLES

Example 1

Porous-Si Preparation

An anodization process was performed by immersing a boron doped (p-type) crystalline silicon substrate with a thickness of approximately 700 microns into a solution of concentrated HF (49%). An electrical bias is then applied to the substrate with respect to a Pt electrode also placed into the solution. The p-doped Group IV semiconductor material layer served as a positive electrode, while the Pt electrode acted as the negative electrode.

The anodization process for Example 1 was performed utilizing a constant current source that operated at a current density of about 5 mA/cm$^2$. The current density for example 1 was applied for about 1200 seconds at room temperature (25° C.) to provide a surface porous region with pores having a depth of about 9.3 µm. Following the anodization process, the porous structure was rinsed with deionized water and then dried.

Example 2

Pre-Lithiation of Porous Silicon

A direct melt-alloying method was utilized to pre-lithiate and metallize the porous silicon anode of Example 1. Lithium metal was heated between 160° C. to 190° C. on a hot plate, allowing the lithium metal to reach a molten state. The porous silicon surface was then brought into intimate contact with the molten lithium metal for about 30 seconds. The unreacted Li metal was subsequently removed from the porous silicon surface.

Figures 4A, 4B:
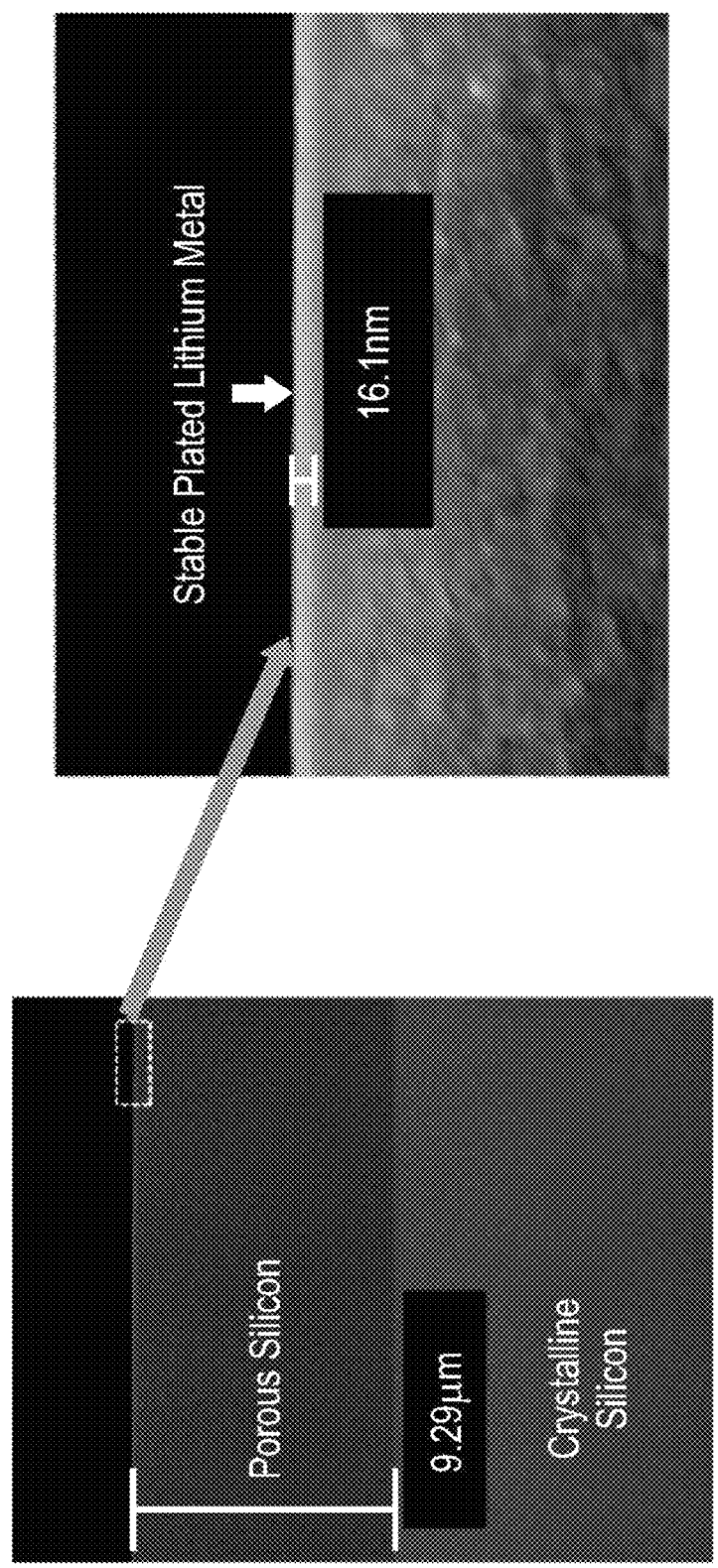
FIG. 4A is a scanning electron micrograph cross-section of a pre-lithiated porous p-type silicon of Example 2 with 1200s of etch time, with an anodization current density of 5 mA/cm$^2$ in 49% HF solution. The dashed boxed highlights the approximate magnified region displayed in FIG. 4B where a ~16 nm layer of lithium metal is attached in unitary construction with the porous silicon electrode.

The process provided a highly smooth (root mean square roughness of <5 angstrom) and planar lithiated surface to form as shown in FIG. 4A. In FIG. 4A, the contrast between the porous and the crystalline silicon is highlighted with the scale bar illustrating a porous silicon region of approximately 9.3 µm. The magnified structure of the surface region (dashed box) of FIG. 4A is shown in FIG. 4B, where a predominantly lithium metal-containing layer of approximately 16 nm is visible.

There was a decreasing concentration of lithium with depth below the Li rich surface region as evident from the color contrast of the SEM (secondary electron microscopy) cross-sections. All regions including the Li rich surface, the porous-Si, and crystalline Si immediately below the porous-Si were electrically, physically and chemically connected to the crystalline silicon substrate in a unitary fashion.

Example 3

Preparation of the Electrolyte and Cell Assembly

Lithium iodide (LiI) was placed in a vial and dried on a hot plate inside an argon filled glovebox (<0.1 ppm $H_2O$ and $O_2$) at 120° C. for 1 hour. 3-Methoxypropionitrile (MPN) was purified with the molecular sieve (3 Å) overnight. 1M of dried LiI was added and dissolved into the MPN and lightly stirred overnight.

A porous silicon anode was prepared via chemical etching process of a crystalline silicon wafer and subsequent pre-lithiation, as described in Examples 1-2 above. The depth of the porous region in the wafer was determined by the amount of etching time.

The resulting solution was used to soak the separator that resided on top of the metallized porous silicon anode, and a cathode current collector was placed on top of the separator. The cathode current collector included porous carbon and a polymeric binder in an approximately 8:1 ratio by weight.

The separator wetted by the electrolyte solution was placed between the porous silicon anode and the cathode current collector, and in contact with both the porous silicon anode and the cathode current collector. The cell assembly with cell components including the porous silicon anode, the separator wetted by the electrolyte solution, and the cathode current collector was performed in an argon filled glovebox (<0.1 ppm $H_2O$ and $O_2$). All the cell components were placed within a Swagelok-type cell equipped with both inlet and outlet tubing for gas flow.

Example 4

Rechargeable Lithium Iodide Battery with Porous Silicon Anode
(Etching time: 500 s)

Figure 5:
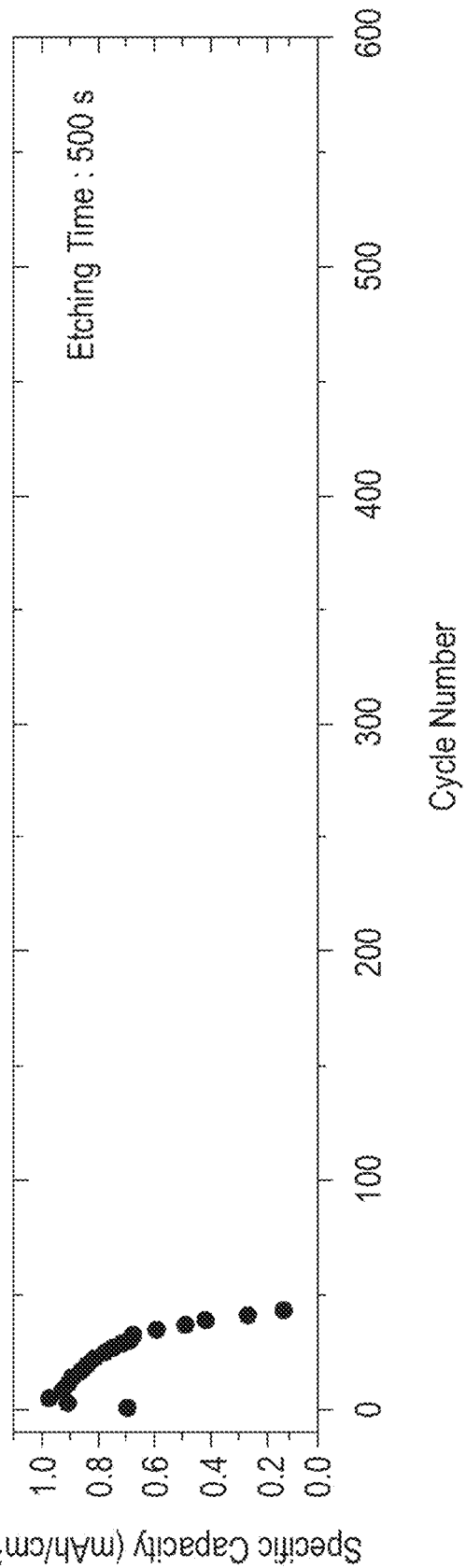
FIG. 5 is a plot of the cycle life of a lithium iodide battery with a porous p-type silicon anode (etching time: 500 s, with an anodization current density of 5 mA/cm$^2$ in 49% HF solution).

FIG. 5 is a plot of cycle number of a rechargeable lithium iodide battery with a porous silicon anode with respect to the specific capacity at the current density of 5 mA/cm$^2$. Etching time was recorded as 500 seconds, which as noted above determines the depth of the porous region formed in the crystalline silicon anode, and increased etching time provides deeper pores in the porous region. The specific discharge capacity started as low as about 0.7 mAh/cm$^2$ at the 1$^{st}$ cycle, increased in the following cycles up to about 1.0 mAh/cm$^2$, and lasted until about the 50$^{th}$ cycle.

Example 5

Rechargeable Lithium Iodide Battery with Porous Silicon Anode
(Etching time: 1200 s)

Figure 6:
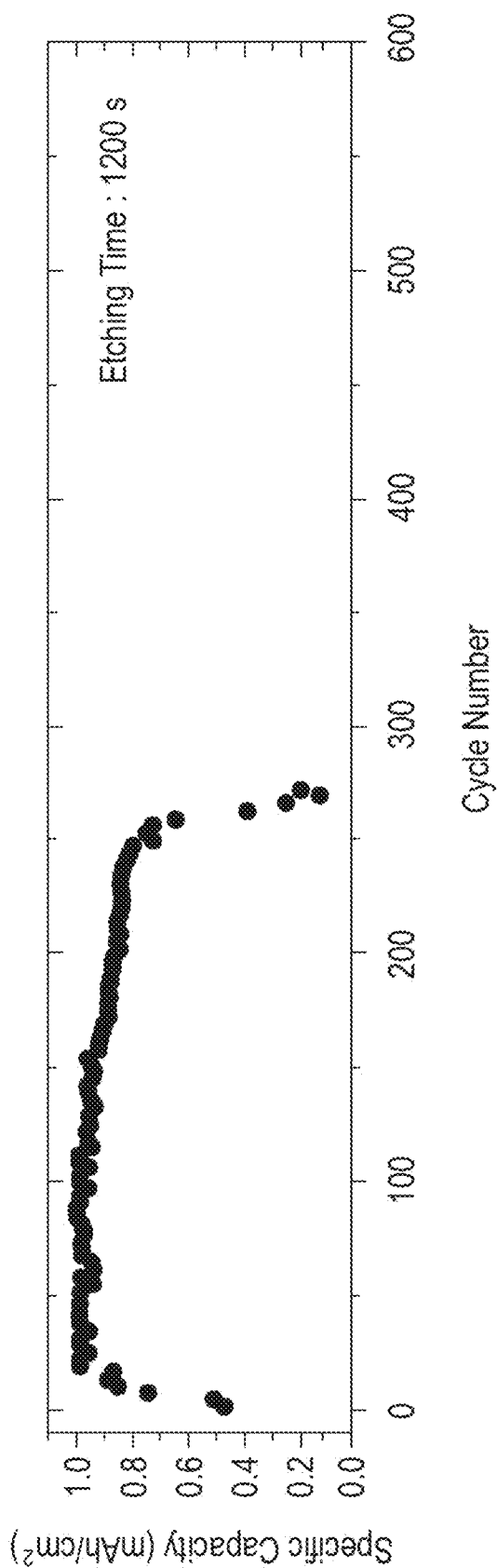
FIG. 6 is a plot of the cycle life of a lithium iodide battery with a porous p-type silicon anode (etching time: 1200 s, with an anodization current density of 5 mA/cm$^2$ in 49% HF solution).

FIG. 6 is a plot of the cycle number of a rechargeable lithium iodide battery with a porous silicon anode with respect to specific capacity at a current density of 5 mA/cm$^2$. The etching time was recorded as 1200 seconds. The specific discharge capacity started as low as about 0.5 mAh/cm$^2$ at 1$^{st}$ cycle, increased in the following cycles up to about 1.0 mAh/cm$^2$, and lasted until about the 250$^{th}$ cycle.

Example 6

Rechargeable Lithium Iodide Battery with Porous Silicon Anode
(Etching time: 2400 s)

Figure 7:
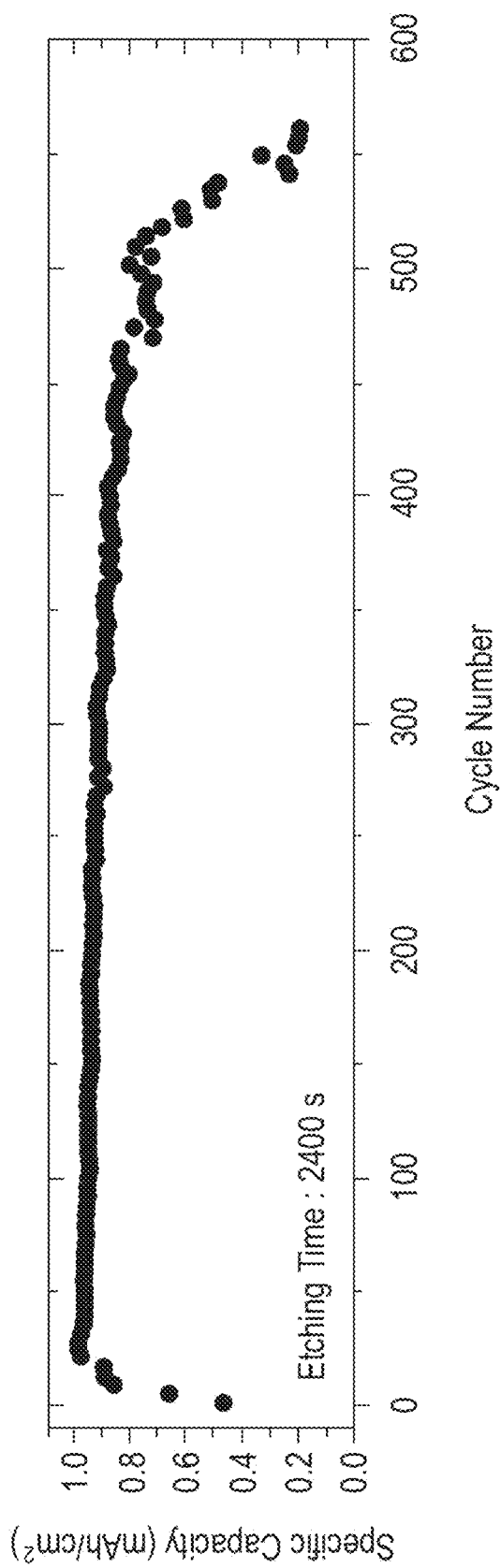
FIG. 7 is a plot of the cycle life of a lithium iodide battery with a porous p-type silicon anode (etching time: 2400 s, with an anodization current density of 5 mA/cm$^2$ in 49% HF solution).

FIG. 7 is a plot of the cycle number of a rechargeable lithium iodide battery with a porous silicon anode with respect to specific capacity at the current density of 5 mA/cm$^2$. Etching time was recorded as 2400 seconds. The specific discharge capacity started as low as about 0.5 mAh/cm² at the 1st cycle, increased in the following cycles up to about 1.0 mAh/cm², and lasted until about the 500th cycle.

Comparative Example 1

Rechargeable Lithium Iodide Battery with Non-Porous Silicon Anode

Figure 8:
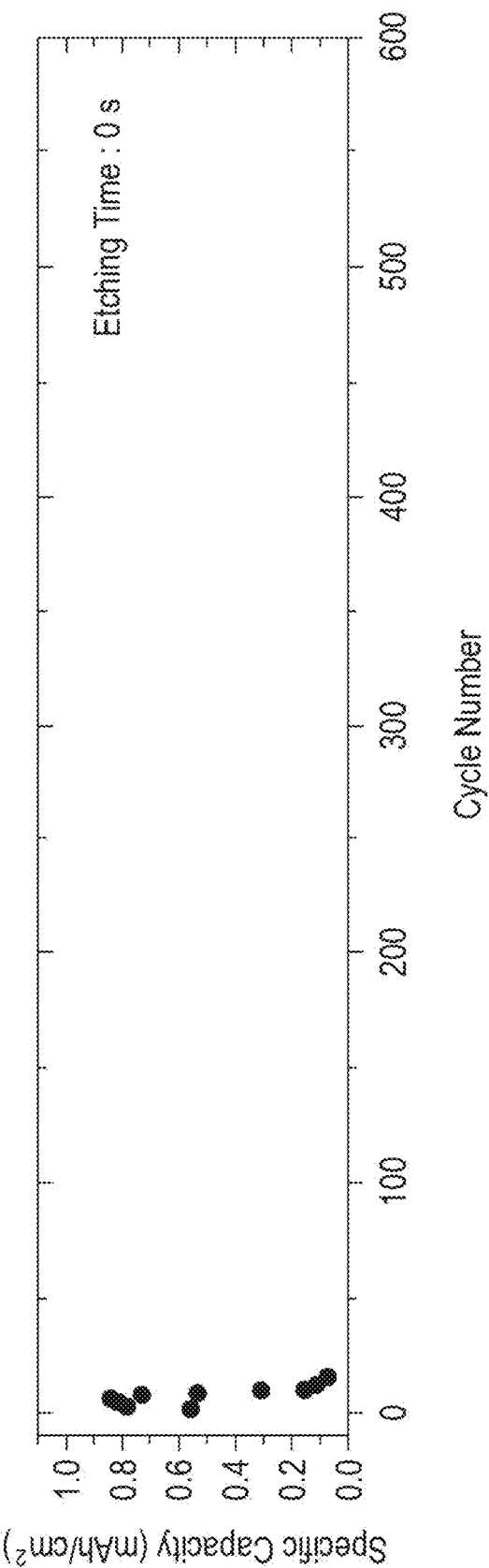
FIG. 8 is a plot of the cycle life of a lithium iodide battery with a bare (non-porous) pre-lithiated silicon anode, which provided a non-anodized control sample.

FIG. 8 is a plot of the cycle number of a rechargeable lithium iodide battery with a bare (non-porous) silicon anode with respect to specific capacity at a current density of 5 mA/cm². Etching time was recorded as 0 s, which indicated that the anode did not include a porous region. The bare (non-porous) silicon anode was pre-lithiated in the same way as described in Examples 4-6 above. The specific discharge capacity started as low as about 0.6 mAh/cm² at the 1st cycle, increased in the following cycles up to about 0.9 mAh/cm², and lasted until about the 20th cycle.

Various embodiments have been described. These and other embodiments are within the scope of the following claims.

What is claimed is:

1. A battery, comprising:
a porous silicon anode comprising (i) a surface with pores having a depth of about 0.5 microns to about 500 microns and (ii) a metal on the surface and in at least some of the pores thereof; and
a current collector; and
an electrolyte in contact with the anode and the current collector, the electrolyte comprising a nitrile moiety and a metal halide configured to act as an undedicated active cathode material.

2. The battery of claim 1, wherein the metal is selected from the group consisting of Li, Na, Mg, Zn, Al, and mixtures and combinations thereof.

3. The battery of claim 2, wherein the metal comprises a layer with an RMS surface roughness of less than about 5 Angstroms.

4. The battery of claim 1, wherein the anode comprises crystalline Si.

5. The battery of claim 1, wherein the anode is doped with a metal selected from the group consisting of B, Al, In, Ga, and mixtures and combinations thereof.

6. The battery of claim 1, comprising a halogen molecule as an active cathode material.

7. The battery of claim 1, comprising a separator between the anode and the cathode.

8. The battery of claim 1, wherein the electrolyte comprises an ion conducting material.

9. The battery of claim 1, wherein the battery comprises an oxidizing gas selected from the group consisting of oxygen, air, nitric oxide, nitrogen dioxide, and mixtures and combinations thereof.

10. The battery of claim 1, wherein the electrolyte comprises a solvent selected from the group consisting of an ether, a glyme, a carbonate, an amide, an amine, an organosulfur solvent, an organophosphorus solvent, an organosilicon solvent, a fluorinated solvent, a heterocyclic solvent, and mixtures and combinations thereof.

11. The battery of claim 1, wherein the metal halide comprises an electrolyte salt that dissociates into a respective halide ion and a respective metal ion in the solvent, and wherein the halide ion comprises an ion of at least one of I, Br, Cl, and F, and the metal ion comprises an ion of at least one of Li, Mg, and Na.

12. The battery of claim 11, further comprising an additional salt that dissociates into a respective metal ion and a respective counter anion, wherein the metal ion is selected from the group consisting of Li, Mg, and Na, and mixtures and combinations thereof, and the anion is selected from the group consisting of nitrate ($NO_3^-$), hexafluorophosphate ($PF_6^-$), tetrafluoroborate ($BF_4^-$), bisoxalato borate ($BOB^-$), and difluorooxalato borate ($DFOB^-$), trifluoromethanesulfonate ($TF^-$), trifluorosulfonylimide ($TFSI^-$), and mixtures and combinations thereof.

13. The battery of claim 1, further comprising a dedicated cathode material in addition to the the metal halide that functions as the undedicated active cathode material, wherein the dedicated cathode material provides a conductive path to an external electrical circuit to which the battery is connected.

14. A battery, comprising:
an anode that takes up metal ions from an electrolyte during charging and releases the metal ions to the electrolyte during discharging, the anode comprising a porous silicon with pores having a depth of at least 0.5 microns;
a current collector; and
an electrolyte comprising a metal halide and a solvent comprising a nitrile compound, wherein (i) the metal in the metal halide is selected from the group of Li, Na, Mg and mixtures and combinations thereof, (ii) the halide in the metal halide is selected from the group consisting of I—, Br—, Cl—, F—, and mixtures and combinations thereof, (iii) the metal halide is configured to act as an undedicated active cathode material, and (iv) the electrolyte is in contact with the anode and the current collector.

15. The battery of claim 14, further comprising a separator between the anode and the cathode.

16. The battery of claim 14, wherein the electrolyte comprises a solvent selected from the group consisting of an ether, a glyme, a carbonate, an amide, an amine, an organosulfur solvent, an organophosphorus solvent, an organosilicon solvent, a fluorinated solvent, heterocyclic solvent and mixtures and combinations thereof.

17. The battery of claim 14, comprising an oxidizing gas selected from the group consisting of air, oxygen, nitric oxide, nitrogen dioxide, and mixtures and combinations thereof.

18. The battery of claim 14, comprising a dedicated cathode material in addition to the metal halide that functions as the undedicated active cathode material.

19. The battery of claim 14, wherein the anode comprises a metal layer overlying the pores.

20. The battery of claim 19, wherein the metal layer has an RMS surface roughness of less than about 5 Angstroms.

21. A method of forming a battery, the method comprising:
anodizing a crystalline Si substrate to form a porous Si anode with pores having a depth of at least 500 nm;
metalizing the porous Si anode with a metal selected from the group consisting of Li, Na, Mg, Zn, Al, and mixtures and combinations thereof;
soaking a separator with an electrolyte solution comprising a metal halide configured as an undedicated active cathode material and a non-aqueous solvent comprising a nitrile compound;
placing the separator soaked with the electrolyte solution between the anode and a current collector; and
introducing an oxidizing gas to the stacked anode, the separator soaked with the solution, and the current collector to form the battery.

22. The method of claim 21, wherein the porous Si anode comprises a layer of Li metal.

23. The method of claim 22, wherein the layer has an RMS surface roughness of less than about 5 Angstroms.

24. The method of claim 21, wherein the porous Si anode is doped with a metal selected from the group consisting of B, Al, In, Ga, and mixtures and combinations thereof.

25. The method of claim 21, wherein a ratio of an average cycle life of the battery, in number of charge/discharge cycles to anodizing time, is greater than or equal to about 2.

* * * * *